United States Patent
Imamura

(10) Patent No.: US 10,416,714 B2
(45) Date of Patent: Sep. 17, 2019

(54) DISPLAY CONTROL DEVICE, AND NON-TRANSITORY COMPUTER-READABLE RECORDING MEDIUM FOR PROVIDING SELECTIVE DISPLAY OF INFORMATION ON MULTIPLE DISPLAYS

(71) Applicant: CASIO COMPUTER CO., LTD., Tokyo (JP)

(72) Inventor: Keiichi Imamura, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/224,259

(22) Filed: Dec. 18, 2018

(65) Prior Publication Data

US 2019/0121389 A1     Apr. 25, 2019

Related U.S. Application Data

(63) Continuation of application No. 15/378,970, filed on Dec. 14, 2016, now Pat. No. 10,228,726.

(30) Foreign Application Priority Data

Dec. 14, 2016 (JP) ................ 2015-252317

(51) Int. Cl.
*G06F 1/16* (2006.01)
*G06F 3/14* (2006.01)
(Continued)

(52) U.S. Cl.
CPC .......... *G06F 1/163* (2013.01); *G06F 1/1637* (2013.01); *G06F 1/1647* (2013.01); *G06F 1/3212* (2013.01); *G06F 1/3265* (2013.01); *G06F 3/147* (2013.01); *G06F 3/1438* (2013.01); *G06F 3/1454* (2013.01); *G09G 2300/023* (2013.01); *G09G 2330/021* (2013.01);
(Continued)

(58) Field of Classification Search
CPC ... G06F 3/1438; G06F 2300/023; G06F 1/163
See application file for complete search history.

(56) References Cited

U.S. PATENT DOCUMENTS

| 8,106,852 B2 | 1/2012 | Fujinawa et al. |
| 2008/0007486 A1 | 1/2008 | Fujinawa et al. |

(Continued)

FOREIGN PATENT DOCUMENTS

| CN | 201393240 Y | 1/2010 |
| CN | 101820457 | 9/2010 |

(Continued)

OTHER PUBLICATIONS

Office Action dated Dec. 21, 2018 issued in the corresponding Japanese Application No. 2015-252317 w/English translation.
(Continued)

*Primary Examiner* — Laurence J Lee
(74) *Attorney, Agent, or Firm* — Cozen O'Connor

(57) ABSTRACT

A display control device comprising a first display, a second display, a first processor, and a second processor, wherein the first processor controls the first display to display a first information, and wherein the second processor controls the second display to display second information which is undisplayable on the first display.

11 Claims, 6 Drawing Sheets

(51) Int. Cl.
*G06F 3/147* (2006.01)
*G06F 1/3212* (2019.01)
*G06F 1/3234* (2019.01)

(52) U.S. Cl.
CPC ...... *G09G 2330/022* (2013.01); *Y02D 10/153* (2018.01); *Y02D 10/174* (2018.01)

(56) References Cited

U.S. PATENT DOCUMENTS

| | | | | |
|---|---|---|---|---|
| 2012/0081272 | A1* | 4/2012 | Ogita | G09G 3/20 |
| | | | | 345/4 |
| 2013/0176237 | A1* | 7/2013 | Chu | G06F 3/1431 |
| | | | | 345/173 |
| 2016/0231974 | A1* | 8/2016 | Lee | G06F 3/1431 |
| 2016/0350049 | A1 | 12/2016 | Barnidge | |

FOREIGN PATENT DOCUMENTS

| | | |
|---|---|---|
| CN | 102385477 | 3/2012 |
| CN | 103561164 | 2/2014 |
| CN | 203858462 U | 10/2014 |
| JP | 2000-171821 | 6/2000 |
| WO | WO 2006/049105 | 5/2006 |
| WO | WO 2008/084549 | 7/2008 |

OTHER PUBLICATIONS

Office Action dated Apr. 22, 2019 issued in Chinese Patent Application No. 201611190727.6.

* cited by examiner

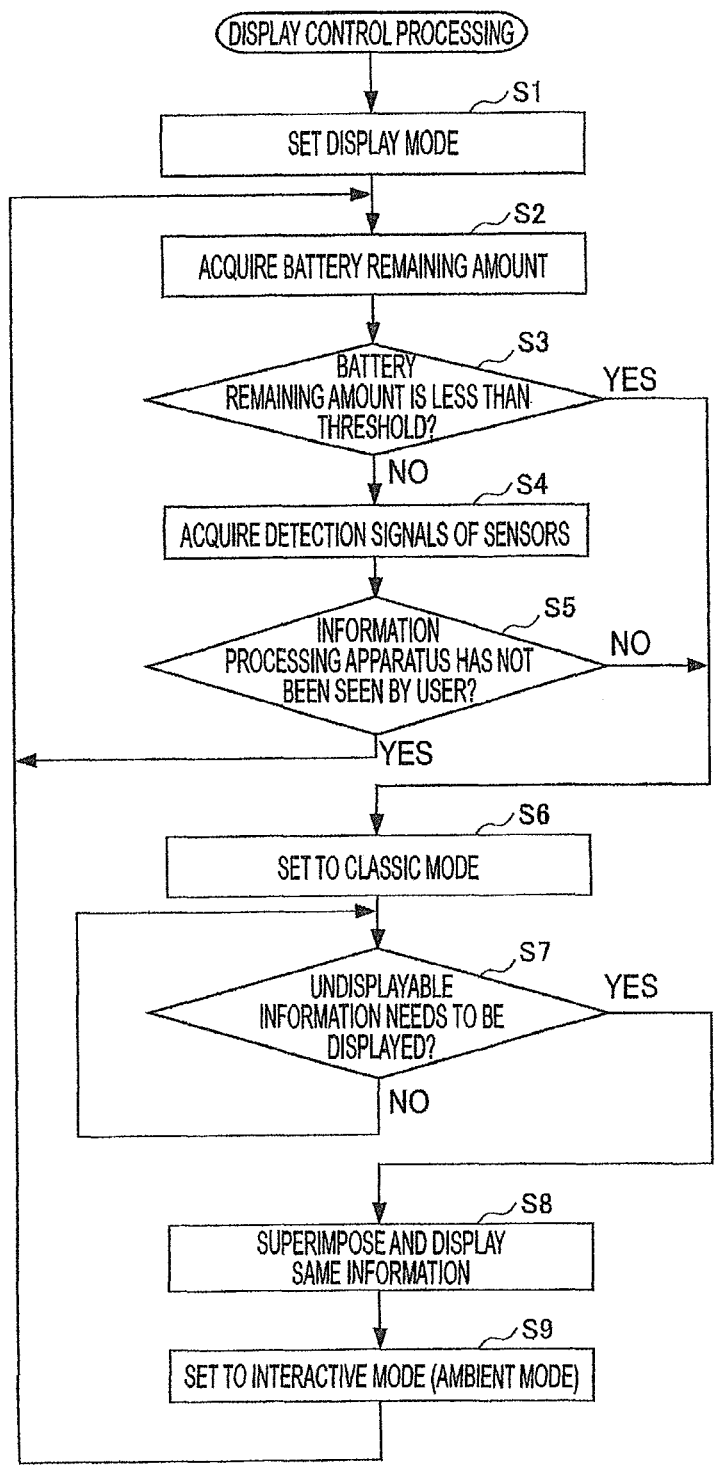

DISPLAY CONTROL DEVICE, AND
NON-TRANSITORY COMPUTER-READABLE
RECORDING MEDIUM FOR PROVIDING
SELECTIVE DISPLAY OF INFORMATION
ON MULTIPLE DISPLAYS

CROSS-REFERENCE TO RELATED
APPLICATIONS

This application is a Continuation of U.S. patent application Ser. No. 15/378,970 filed Dec. 14, 2016 (now U.S. Pat. No. 1,019,803) which claims priority of Japanese Patent Application No. 2015-252317 filed on Dec. 24, 2015, the disclosure contents of all of which are hereby incorporated by reference.

BACKGROUND OF THE INVENTION

1. Field of the Invention

The present invention relates to a display control device, a display control method, and a program.

2. Description of the Related Art

Conventionally, as disclosed in JP 2000-171821 A, there has been known an electronic apparatus which performs display with two layers of display apparatuses, and displays different information on each display apparatus.

BRIEF SUMMARY OF THE INVENTION

One aspect of the present invention is a display control device including a computing device which is operable to function as a unit including: a first display control unit configured to display first information on a first display unit; a second display control unit configured to display, on a second display unit, at least a part of the first information and second information undisplayable on the first display unit; and a display selection unit configured to alternatively select control by the first display control unit or the second display control unit.

Another aspect of the present invention is a display control method executed by an information processing apparatus, the display control method including: a first display control step of displaying first information on a first display unit; a second display control step of displaying, on a second display unit, at least a part of the first information and second information undisplayable on the first display unit; and a display selection step of alternatively selecting control by the first display control step or the second display control step.

Another aspect of the present invention is a non-transitory computer-readable recording medium storing a program for causing a computer which controls an information processing apparatus to implement: a first display control function to display first information on a first display unit; a second display control function to display, on a second display unit, at least a part of the first information and second information undisplayable on the first display unit; and a display selection function to alternatively select control by the first display control function or the second display control function.

BRIEF DESCRIPTION OF THE SEVERAL
VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a flowchart explaining display control processing performed by the information processing apparatus;

Figure 6A:
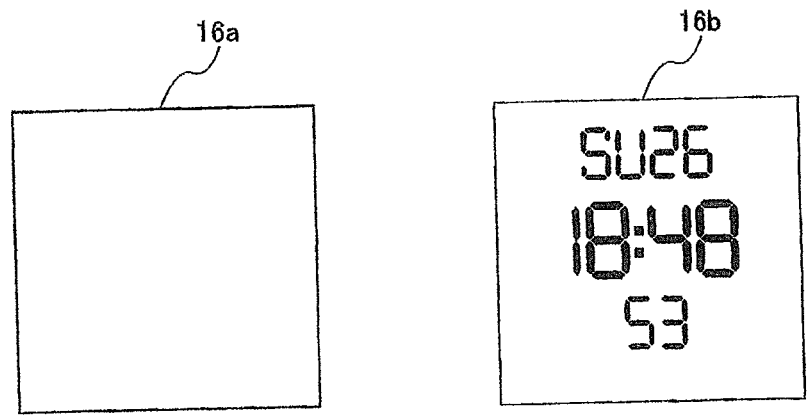
FIG. 6A is a diagram schematically illustrating an example (modified example) of a state of the display screens of the information processing apparatus when the display control processing is performed, and illustrating a display state in the classic mode.
Figure 6B:
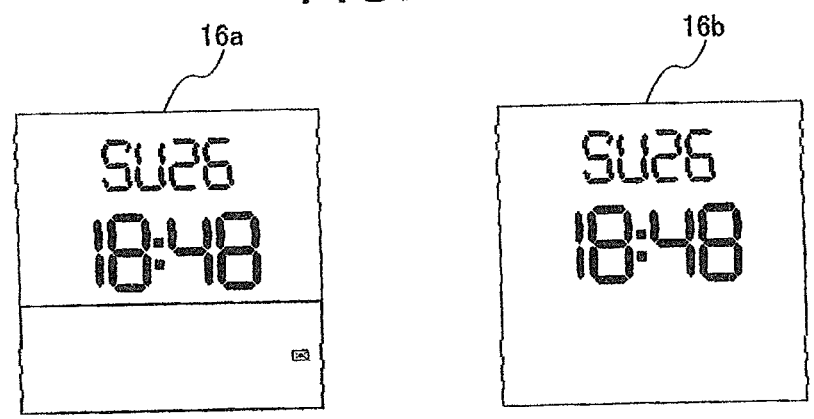
Figure 6C:
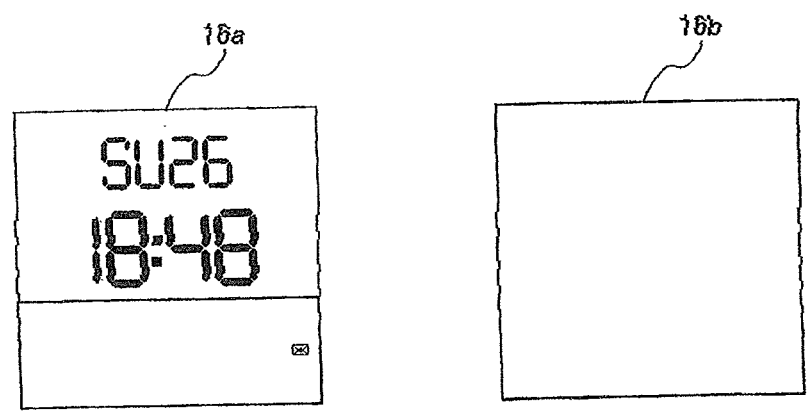

FIG. 6B is a diagram schematically illustrating an example (modified example) of a state of the display screens of the information processing apparatus when the display control processing is performed, and illustrating a display state when the classic mode is shifted to the interactive mode (or the ambient mode); and FIG. 6C is a diagram schematically illustrating an example (modified example) of a state of the display screens of the information processing apparatus when the display control processing is performed, and illustrating a display state in the interactive mode (or the ambient mode).

DETAILED DESCRIPTION OF THE
INVENTION

Embodiments of the present invention will be explained with reference to the drawings.

An embodiment of the present invention is described with reference to the drawings below.

An information processing apparatus according to the present embodiment is configured as a wearable information processing apparatus, such as a smart watch. The information processing apparatus includes a first display unit and a second display unit which are layered and installed thereby.

Various types of information is displayed on the first display unit in color, and limited information is displayed on the second display unit in monochrome. Furthermore, in the information processing apparatus, the state in which the limited information (first information) is displayed on the second display unit is a basic state, and the first display unit is inactive in the basic state. Then, when information which cannot be displayed on the second display unit (second information) needs to be displayed, such as color display or various contents display, the first display unit is activated so that the display contents on the second display unit (that is, the first information) is copied and displayed on the first display unit, and the second display unit is inactivated. Then, the information which cannot be displayed on the second display unit, such as color display or various contents display (that is, the second information) is displayed on the first display unit.

Thus, it is possible for an apparatus including a plurality of display apparatuses to perform display with lower power consumption.

[Configuration]

Figure 1:
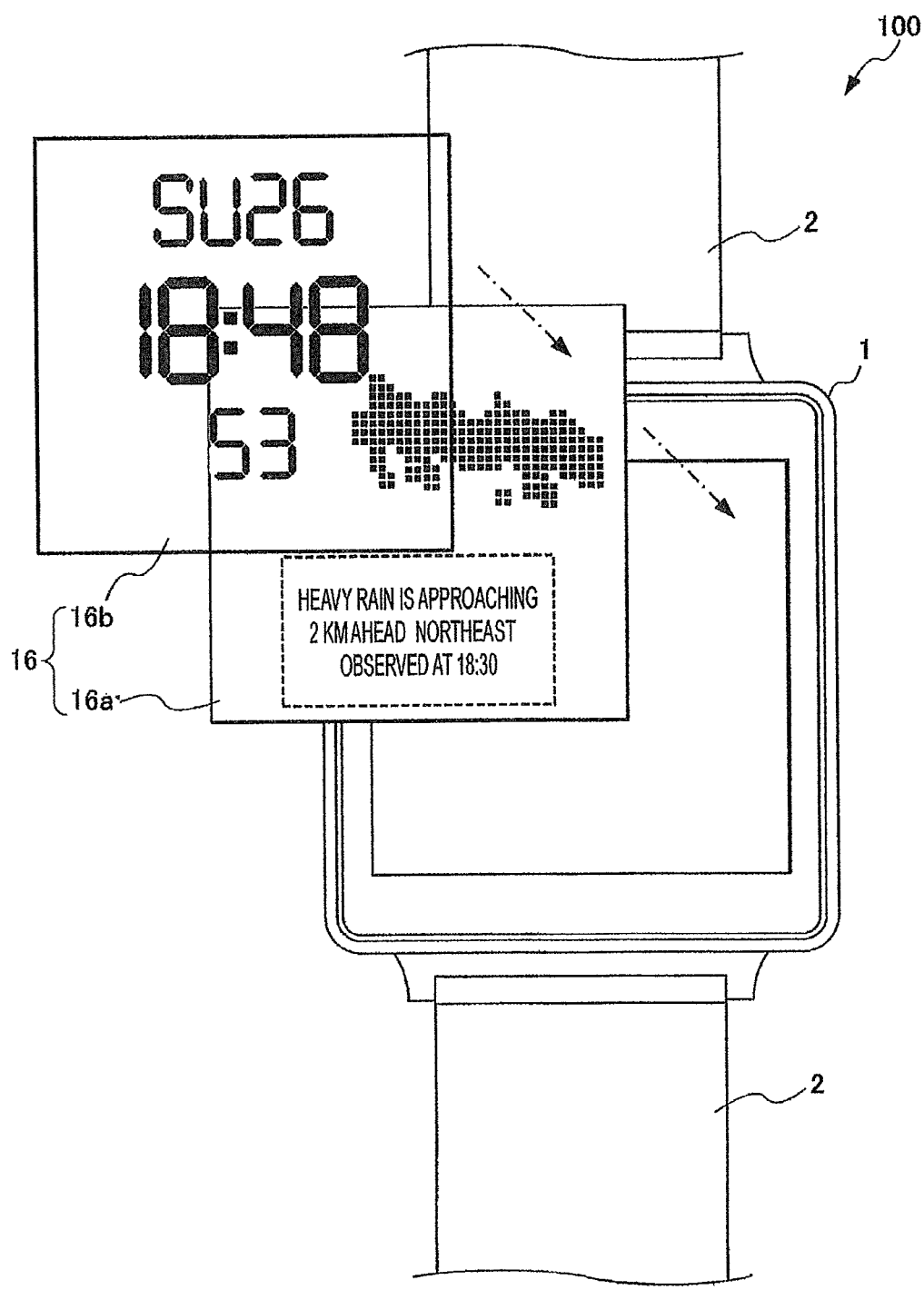
FIG. 1 is a diagram schematically illustrating an information processing apparatus which is a display control device in an embodiment of the present invention.

FIG. 1 is a diagram schematically illustrating an information processing apparatus 100 which is a display control device in an embodiment of the present invention.

As illustrated in FIG. 1, the information processing apparatus 100 in the present embodiment is a wristwatch type, and includes a main body part 1 and a band part 2. Furthermore, the information processing apparatus 100 includes a display unit 16 in the main body part 1. The display unit 16 includes a first display unit 16a (a second display unit) and a second display unit 16b (a first display unit), and is formed, specifically, by layering the second display unit 16b on the first display unit 16a. Thus, the display unit 16 can superimpose display on the second display unit 16b (for example, clock display) on display on the first display unit 16a (for example, various messages) as needed. Furthermore, a touch panel which is an operation unit 19, which is not illustrated, is provided on the second display unit 16b.

Figure 2:
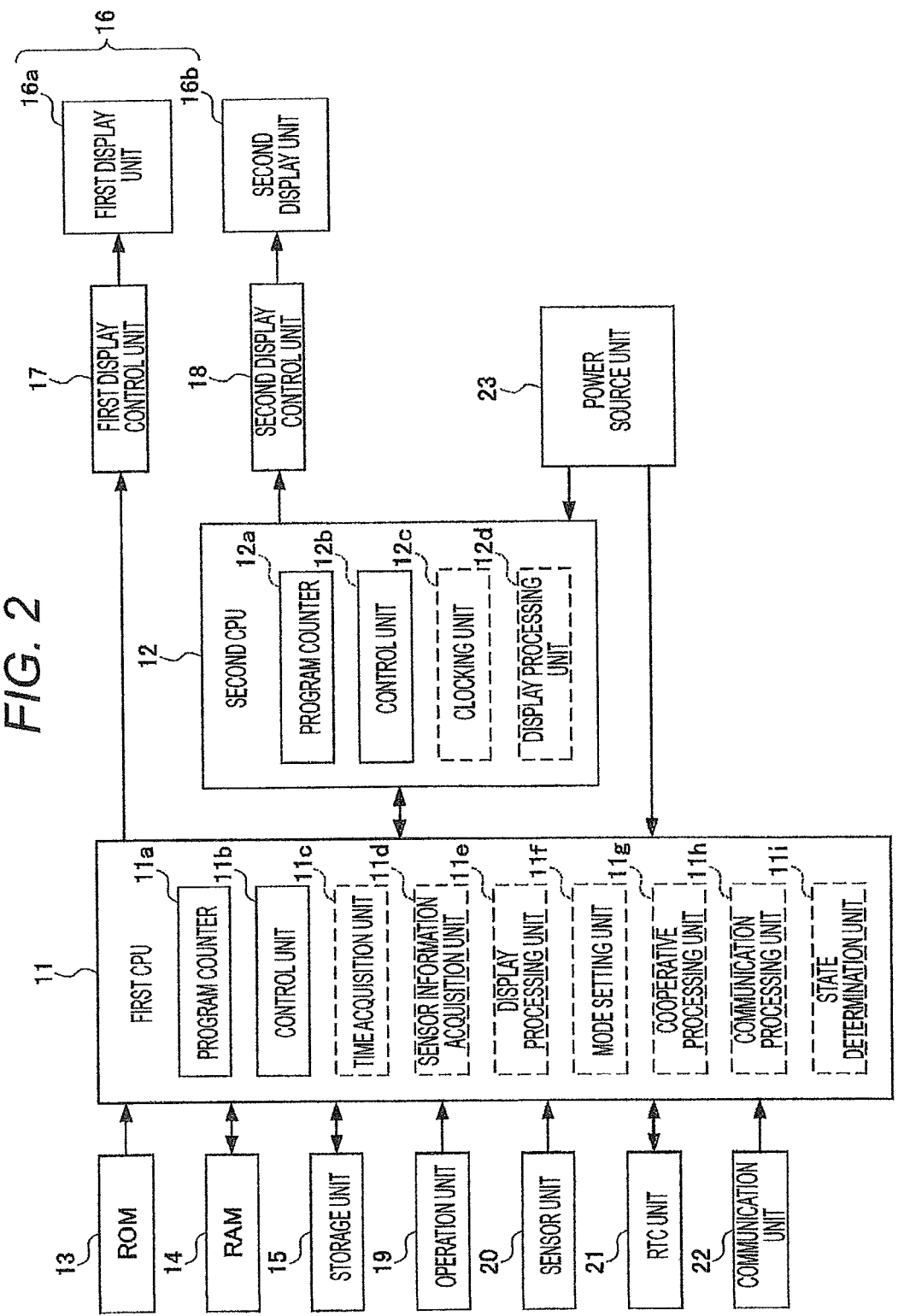
FIG. 2 is a block diagram schematically illustrating a configuration of the information processing apparatus in the embodiment.

FIG. 2 is a block diagram schematically illustrating a configuration of the information processing apparatus 100 in the present embodiment.

As illustrated in FIG. 2, the information processing apparatus 100 includes a first CPU 11, a second CPU 12, a ROM 13, a RAM 14, a storage unit 15, a display unit 16 (a first display unit 16a and a second display unit 16b), a first display control unit 17 (a second display control unit) which controls display on the first display unit 16a, a second display control unit 18 (a first display control unit) which controls display on the second display unit 16b, an operation unit 19, a sensor unit 20, a real time clock (RTC) unit 21, a communication unit 22 (an information acquisition unit), and a power source unit 23.

The first CPU 11 performs various types of arithmetic processing, and controls functions similar to a smart phone in the information processing apparatus 100 by performing processing of the OS. In the present embodiment, the first CPU 11 performs, to the first display control unit 17, an instruction of display control to display incoming of an electronic mail, a message relating to weather information, and the like which are received through the communication unit 22, and also performs processing relating to various functions mounted as the functions similar to the smart phone. Note that, the first CPU 11 can display, on the first display unit 16a, display contents similar to display contents displayed on the second display unit 16b by the second CPU 12 with a function of a wristwatch.

In the present embodiment, the first CPU 11 acquires a time signal from the RTC unit 21 at a predetermined timing, and outputs the acquired time signal to the second CPU 12. Furthermore, the first CPU 11 performs, to the first display control unit 17, an instruction to display the time input from the second CPU 12.

Note that, the specific configuration of the first CPU 11 will be described later.

The second CPU 12 performs processing of particular programs, and thereby performs an instruction of display control to the second display control unit 18 and processing relating to various functions mounted as the function of the wristwatch. In the present embodiment, the second CPU 12 calculates a time based on the time signal input from the first CPU 11 and performs, to the second display control unit 18, an instruction of display control to display the time, a day, a date, or the like. Furthermore, the second CPU 12 outputs the calculated time to the first CPU 11. Since the processing of the particular programs performed by the second CPU 12 is a simple operation compared to the processing of the OS performed by the first CPU 11, the processing load on the second CPU 12 is small, and the second CPU 12 can perform the processing with low power consumption. Thus, the hardware performance requested for the second CPU 12 is lower than that requested for the first CPU 11.

Note that, the specific configuration of the second CPU 12 will be described later.

The ROM 13 can read data from both of the first CPU 11 and the second CPU 12, and stores various programs executed by the first CPU 11 and the second CPU 12, and initial setting data. For example, the ROM 13 stores programs of the OS executed by the first CPU 11 and various programs executed under the control of the OS, or the particular programs executed by the second CPU 12 (here, embedded programs to implement the function of the wristwatch).

The RAM 14 can read and write data from/to both of the first CPU 11 and the second CPU 12, provides the first CPU 11 and the second CPU 12 with a memory space for work, and stores temporary data for the work. For example, the RAM 14 provides a system area or a work area used by the first CPU 11 to execute the OS, and a storage area used by the second CPU 12 to execute the particular programs.

The storage unit 15 is a nonvolatile memory from/to which both of the first CPU 11 and the second CPU 12 can read and write data, such as a flash memory or an electrically erasable and programmable read only memory (EEPROM). The storage unit 15 stores various types of data (data of various setting contents) generated by the various functions similar to the smart phone or the function of the wristwatch.

The display unit 16 includes, as described above, the first display unit 16a and the second display unit 16b.

The first display unit 16a is constituted of an active matrix type liquid crystal display apparatus including a TFT color liquid crystal panel with a backlight, and displays various types of information on a display screen under the control of the first display control unit 17, which will be described later.

The first display control unit 17 performs control to generate display data and display the display data on the display screen of the first display unit 16a.

In the present embodiment, the first display control unit 17 generates display data of a message relating to electronic mail incoming or weather information, and outputs the display data from the first display unit 16a according to, for example, a display instruction from the first CPU 11.

The second display unit 16b is constituted of a polymer network (PN) liquid crystal panel (here, a simple matrix type liquid crystal display apparatus) capable of transmitting light partially or as a whole, and displays (here, performs segment display of) various types of information on a display screen under the control of the second display control unit 18, which will be described later.

In the present embodiment, the PN liquid crystal panel which is the second display unit 16b is, as illustrated in FIG. 1, layered on the display screen of the TFT color liquid crystal panel which is the above described first display unit 16a. At the part to which potential is not applied, liquid crystal molecules are irregularly arranged and the PN liquid crystal panel reflects light. This means that the PN liquid crystal panel performs display at the part to which potential is not applied. On the other hand, at the part to which potential is applied, liquid crystal molecules are arranged perpendicularly to the display screen and the PN liquid crystal panel can transmit light. This means that light from the above described TFT color liquid crystal panel can be transmitted at the part to which potential is applied, the display on the TFT color liquid crystal panel can be visually recognized through the PN liquid crystal panel. In other words, the display unit 16 in the present embodiment can display the display on the second display unit 16b being superimposed on the display on the first display unit 16a.

The second display control unit 18 performs control to generate display data and display the display data on the display screen of the second display unit 16b.

In the present embodiment, the second display control unit 18 generates display data of a time image and outputs the display data from the second display unit 16b according to, for example, a display instruction from the second CPU 12.

The operation unit 19 is a capacitance touch panel provided on the display screen of the second display unit 16b. The operation unit 19 detects a user's touch operation position and the operation contents on the touch panel, generates a signal according to the operation, and outputs the signal to the first CPU 11 as an input signal.

The sensor unit 20 includes various sensors, such as a position sensor using a geomagnetism sensor, a gyro sensor, a three-axis acceleration sensor, an atmospheric pressure sensor, an air temperature sensor, or a global positioning system (GPS). In the present embodiment, a detection signal of the sensor unit 20 is output to the first CPU 11. Note that, by outputting the detection signal of the sensor unit 20 to the second CPU 12, information based on the detection signal of the sensor may be displayed as part of the function of the wristwatch.

The RTC unit 21 includes oscillation elements of a crystal oscillator or the like, and continuously counts a time by power supply from the power source unit 23 or an auxiliary power source (a primary battery or the like) while the information processing apparatus 100 is not turned on. In the present embodiment, the RTC unit 21 outputs a time signal indicating the counted time to the first CPU 11. Note that, the time signal of the RTC unit 21 may be output to the second CPU 12.

The communication unit 22 includes a wireless communication function, such as a Bluetooth (registered trademark), a Bluetooth Low Energy (BLE) (trademark), or a Wireless Fidelity (Wi-Fi), and communicates with other electronic devices (a smart phone or the like).

The power source unit 23 supplies power relating to the operations of the information processing apparatus 100 at a predetermined voltage. The power source unit 23 includes, for example, various batteries (a lithium battery, a nickel/hydrogen rechargeable battery, or the like). In the present embodiment, the power source unit 23 supplies power to the first CPU 11 and the second CPU 12.

Furthermore, the power source unit 23 detects a battery remaining amount, and outputs a signal indicating the detected battery remaining amount to the first CPU 11.

Next, the specific configurations of the first CPU 11 and the second CPU 12 are described below.

As illustrated in FIG. 2, the first CPU 11 includes a program counter 11a and a control unit 11b as a hardware configuration. Furthermore, the first CPU 11 implements, by executing the programs of the OS or various programs (display control processing or the like to be described later), a time acquisition unit 11c, a sensor information acquisition unit 11d, a display processing unit 11e, a mode setting unit 11f (a mode switching unit), a cooperative processing unit 11g (a display selection unit), a communication processing unit 11h, and a state determination unit 11i (a determination unit and a time count unit).

The program counter 11a is a register provided inside the first CPU 11, and stores the address of the RAM 14 storing a next program to be executed.

The control unit 11b controls the operations of the units inside the first CPU 11 (a decoding circuit, an arithmetic circuit, and the like which are not illustrated), such as an operation timing or operation contents in order for the first CPU 11 to execute programs. Furthermore, the control unit 11b successively writes, to the program counter 11a, the address of the RAM 14 storing a next program to be executed.

The time acquisition unit 11c acquires a time signal from the RTC unit 21 at a predetermined timing (for example, at the activation time or a time adjustment time). Then, the time acquisition unit 11c outputs the acquired time signal to the second CPU 12. Furthermore, the time acquisition unit 11c acquires the time calculated and output by the second CPU 12.

The sensor information acquisition unit 11d acquires the detection signal of the various sensors included in the sensor unit 20.

The display processing unit 11e outputs, to the first display control unit 17, an instruction signal for display control to display information or a processing result acquired by the functional units.

The mode setting unit 11f sets, according to the user's setting or a state of the information processing apparatus 100, any one of a plurality of display modes in order for the information processing apparatus 100 to display information. In the present embodiment, three display modes of an interactive mode, an ambient mode, and a classic mode are prepared in the information processing apparatus 100.

The interactive mode is a display mode which enables various types of display including color display on the first display unit 16a. In the interactive mode, it is possible to perform, for example, display update at the maximum rate of 30 fps, display of a second hand, full color display, execution of anti-aliasing processing, display of an arbitrary message, display of various types of information relating to the OS operation, and the like.

The ambient mode is a display mode to perform display with low power consumption on the first display unit 16a. In the ambient mode, while the brightness of the backlight of the first display unit 16a is lower than that in the interactive mode, it is possible to perform, for example, display update once a minute, non-display of a second hand, color display in a gray scale or at a predetermined rate or less of the whole area (for example, 5%), execution of anti-aliasing processing according to conditions, display of an arbitrary message, display of various types of information relating to the OS operation, and the like. In the ambient mode, the brightness of the backlight of the first display unit 16a is lowered, and the display design on the first display unit 16a is to be high contrast (for example, bold lines, or the like).

The classic mode is a display mode to perform limited display in monochrome on the second display unit 16b. In the classic mode, the clock display as the wristwatch is performed with the segment display on the second display unit 16b. Thus, various types of display, such as display of an arbitrary message or various types of information relating to the OS operation is not performed. Note that, as described later, when information which cannot be displayed in the classic mode, such as display of an arbitrary message, needs to be displayed in the classic mode, the classic mode is switched to the interactive mode (or the ambient mode) in the display control processing.

When the state determination unit 11i determines that the user has not seen the information processing apparatus 100 for a certain time or more, the mode setting unit 11f switches the interactive mode or the ambient mode to the classic mode.

Furthermore, when the state determination unit 11i determines that the battery remaining amount is less than a preset threshold, the mode setting unit 11f switches the interactive mode or the ambient mode to the classic mode.

Moreover, the state determination unit 11i determines that the classic mode is set and information which cannot be displayed in the classic mode needs to be displayed, the mode setting unit 11f switches the classic mode to the interactive mode or the ambient mode. At this time, whether the mode setting unit 11f shifts the classic mode to the interactive mode or the ambient mode can be preset, or set according to the information to be displayed.

The cooperative processing unit 11g performs processing relating to cooperation between the first CPU 11 and the second CPU 12. Specifically, when the processing by the first CPU 11 has relevance to the processing by the second CPU 12, the cooperative processing unit 11g performs processing to coordinate either of the first CPU 11 or the second CPU 12 with the other. For example, when the mode setting unit 11f sets the display mode to the classic mode and information which cannot be displayed in the classic mode, such as display of an arbitrary message or display of various types of information relating to the OS operation, is displayed (that is, the display mode is switched to the ambient mode or the interactive mode), the cooperative processing unit 11g coordinates the instructions of display control to be performed by the first CPU 11 and the second CPU 12. In this case, the cooperative processing unit 11g coordinates the instructions of display control to be performed by the first CPU 11 and the second CPU 12 so that the same information is superimposed and displayed on the first display unit 16a and the second display unit 16b, and then the display mode is shifted to the interactive mode (or the ambient mode). In other words, the cooperative processing unit 11g acquires the display contents which the second CPU 12 displays on the second display unit 16b, and notifies the display processing unit 11e of the first CPU 11 of the contents. Thus, the display processing unit 11e performs, to the first display control unit 17, the instruction of display control to perform display coordinates with the display contents on the second display unit 16b.

Furthermore, when the mode setting unit 11f sets the display mode to the interactive mode or the ambient mode, the cooperative processing unit 11g performs, to the second CPU 12, an instruction to stop the operation of the second display unit 16b (maintain the state in which light is transmitted and information is not displayed). On the other hand, when the mode setting unit 11f sets the display mode to the classic mode, the cooperative processing unit 11g performs, to the first CPU 11, an instruction to stop the operation of the first display unit 16a (stop the power supply). Thus, it is possible to suppress the power consumption of an unnecessary display unit, and for the information processing apparatus 100 to perform necessary display with low power consumption.

The communication processing unit 11h outputs information received through the communication unit 22 to functional units according to the information, and transmits, through the communication unit 22, the information transmitted from the functional units to other electronic devices. For example, when receiving information notifying of incoming of an electronic mail from other electronic devices (a paired smart phone or the like) through the communication unit 22, the communication processing unit 11h outputs the received information to the display processing unit 11e.

The state determination unit 11i determines various states of the information processing apparatus 100, and performs processing according to the determination result. For example, the state determination unit 11i determines, based on the detection signals of the gyro sensor and the three-axis acceleration sensor acquired by the sensor information acquisition unit 11d, the using state of the information processing apparatus 100, for example, whether the information processing apparatus 100 remains stationary (the user remains stationary or the information processing apparatus 100 is not worn on the user's arm), the user has adopted a posture to see the information processing apparatus 100 by holding up his/her arm, the user has lowered his/her arm, the user's swinging of his/her arm (swinging the arm when running or walking) has been detected, or the like. Then, when determining that the information processing apparatus 100 is in the using state of not being seen by the user, for example, the information processing apparatus 100 remains stationary, the user has not adopted a posture to see the information processing apparatus 100, the user has lowered his/her arm, or the user's swinging of his/her arm has been detected, or the like, the state determination unit 11i notifies the mode setting unit 11f of the using state in which the information processing apparatus 100 has not been seen by the user. Note that, these using states can be determined by, for example, storing signal patterns of the gyro sensor and the three-axis acceleration sensor corresponding to the operations in the storage unit 15 and matching the detected signal pattern.

Furthermore, the state determination unit 11i determines, based on the signal indicating the battery remaining amount input from the power source unit 23, whether the battery remaining amount is less than the preset threshold. Then, when determining that the battery remaining amount is less than the preset threshold, the state determination unit 11i notifies the mode setting unit 11f that the battery remaining amount is less than the preset threshold.

By the above processing, when the user has not seen the display screen of the information processing apparatus 100 or when the battery remaining amount of the information processing apparatus 100 becomes small, the mode setting unit 11f changes the display mode of the information processing apparatus 100 to the classic mode, and only performs display of the wristwatch on the second display unit 16b. Thus, when two display units of the first display unit 16a and the second display unit 16b are provided, it is possible for the information processing apparatus 100 to perform display with lower power consumption.

Furthermore, the state determination unit 11i determines whether display of an arbitrary message or various types of information relating to the OS operation needs to be displayed due to communication from the outside, interruption processing of the information processing apparatus 100, or the like.

Then, when determining that display of an arbitrary message or various types of information relating to the OS operation needs to be displayed in the classic mode, the state determination unit 11i notifies the mode setting unit 11f that information which cannot be displayed in the classic mode needs to be displayed Thus, the mode setting unit 11f sets the display mode so as to shift the display mode to the interactive mode (or the ambient mode).

By the above processing, when the classic mode is shifted to the interactive mode or the ambient mode, it is possible to smoothly shift the display screen, and suppress uncomfortable feeling given to the user.

As illustrated in FIG. 2, the second CPU 12 includes a program counter 12a and a control unit 12b as a hardware configuration. Furthermore, the second CPU 12 implements a clocking unit 12c and a display processing unit 12d by executing the particular programs.

The program counter 12a is a register provided inside the second CPU 12, and stores the address of the RAM 14 storing a next program to be executed.

The control unit 12b controls the operations of the units inside the second CPU 12 (a decoding circuit, an arithmetic circuit, and the like which are not illustrated), such as an operation timing or operation contents in order for the second CPU 12 to execute programs. Furthermore, the control unit 12b successively writes, to the program counter 12a, the address of the RAM 14 storing a next program to be executed.

The clocking unit 12c calculates a time based on the time signal input from the first CPU 11. Then, the clocking unit 12c outputs the calculated time to the first CPU 11.

When the information processing apparatus 100 is set to the classic mode, the display processing unit 12d outputs, to the second display control unit 18, an instruction signal for display control to display the processing result of the clocking unit 12c.

[Operations]

Next, the operations are described.

FIG. 3 is a flowchart explaining display control processing performed by the information processing apparatus 100.

Figure 4A:
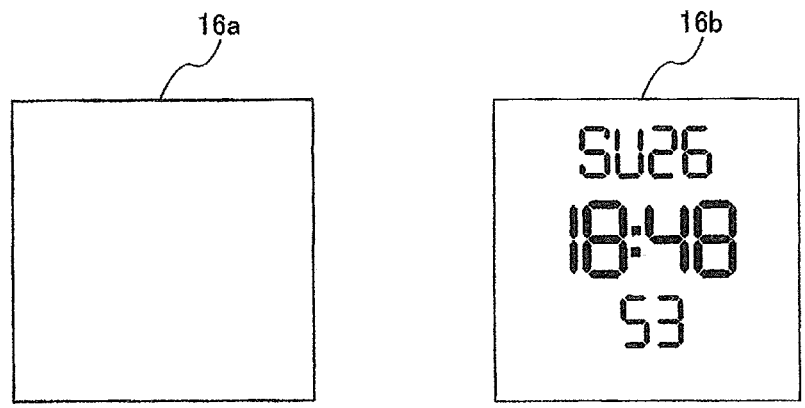
FIG. 4A is a diagram schematically illustrating an example of a state of display screens of the information processing apparatus when the display control processing is performed, and illustrating a display state in a classic mode.
Figure 4B:
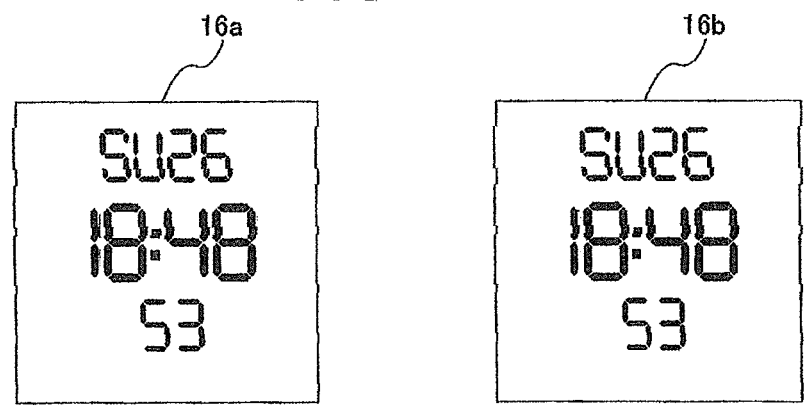
FIG. 4B is a diagram schematically illustrating an example of a state of the display screens of the information processing apparatus when the display control processing is performed, and illustrating a display state when a classic mode is shifted to an interactive mode (or an ambient mode)
Figure 4C:
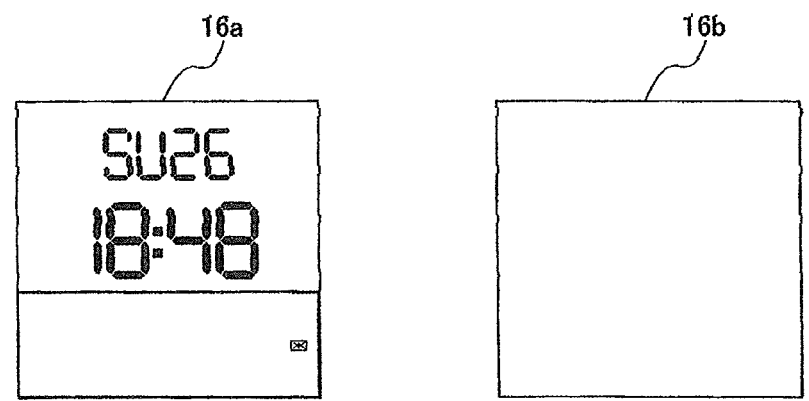
FIG. 4C is a diagram schematically illustrating an example of a state of the display screens of the information processing apparatus when the display control processing is performed, and illustrating a display state in the interactive mode (or the ambient mode)

FIGS. 4(A) to 4(C) are diagrams schematically illustrating states of the display screens of the information processing apparatus 100 when the display control processing is performed. FIG. 4(A) illustrates a display state in the classic mode. FIG. 4(B) illustrates a display state while the classic mode is shifted to the interactive mode (or the ambient mode). FIG. 4(C) illustrates a display state in the interactive mode (or the ambient mode).

The display control processing illustrated in FIG. 3 is described below with reference to FIG. 4 as needed.

The display control processing is started at the time when the information processing apparatus 100 is turned on, and repeatedly performed until the information processing apparatus 100 is turned off.

In step S1, the mode setting unit 11f sets the display mode to any one of the interactive mode, the ambient mode, or the classic mode according to the user's setting.

In step S2, the state determination unit 11i acquires the battery remaining amount based on the signal indicating battery remaining amount input from the power source unit 23.

In step S3, the state determination unit 11i determines whether the battery remaining amount is less than the preset threshold.

When the battery remaining amount is not less than the preset threshold, the state determination unit 11i determines NO in step S2, and the processing shifts to step S4.

On the other hand, when the battery remaining amount is less than the preset threshold, the state determination unit 11i determines YES in step S2, and the processing shifts to step S6.

In step S4, the sensor information acquisition unit 11d acquires detection signals of the various sensors included in the sensor unit 20.

In step S5, the state determination unit 11i determines whether the information processing apparatus 100 is in the using state of not being seen by the user based on the detection signals of the various sensors (the gyro sensor, the three-axis acceleration sensor, and the like) acquired by the sensor information acquisition unit 11d. Specifically, the state in which the information processing apparatus 100 remains stationary (is not worn on the user's arm), the user has adopted a posture to see the information processing apparatus 100 by holding up his/her arm, the user has lowered his/her arm, the user's swinging of his/her arm (swinging the arm when running or walking) has been detected, or the like is determined.

When the information processing apparatus 100 is in the using state of not being seen by the user, the state determination unit 11i determines NO in step S5, and the processing shifts to step S6.

When the information processing apparatus 100 is not in the using state of not being seen by the user, the state determination unit 11i determines YES in step S5, and the processing shifts to step S2.

In step S6, the mode setting unit 11f sets the display mode to the classic mode. Thus, the operation of the first display unit 16a is stopped, and the screen to display the time as the wristwatch is displayed on the second display unit 16b.

In step S7, the state determination unit 11i determines whether information which cannot be displayed in the classic mode needs to be displayed.

When the information which cannot be displayed in the classic mode needs to be displayed, the state determination unit 11i determines YES in step S7, and the processing shifts to step S8.

When the information which cannot be displayed in the classic mode does not need to be displayed, the state determination unit 11i determines NO in step S7, and the processing in step S7 is repeated.

In step S8, the cooperative processing unit 11g superimposes the same information as that of the second display unit 16b on the first display unit 16a, and displays the information.

In step S9, the mode setting unit 11f sets the display mode to the interactive mode (or the ambient mode).

After step S9, the processing shifts to step S2.

By the above processing, when the user has not seen the display screen of the information processing apparatus 100 or when the battery remaining amount of the information processing apparatus 100 becomes small, the mode setting unit 11f changes the display mode of the information processing apparatus 100 to the classic mode, and only performs display of the wristwatch on the second display unit 16b.

Thus, when two display units of the first display unit 16a and the second display unit 16b are provided, it is possible for the information processing apparatus 100 to perform display with lower power consumption.

Note that, unlike the above described embodiments, the switching between the classic mode and the interactive mode may be performed by the user's input operation, for example, in response to the user's input operation to the operation unit 19.

When the classic mode is shifted to the interactive mode, the same information is temporarily superimposed and displayed on the first display unit 16a and the second display unit 16b, and then the classic mode is shifted to the interactive mode (or the ambient mode).

In other words, the state in which the operation of the first display unit 16a is stopped and the display of the wristwatch is displayed on the second display unit 16b in the classic mode as illustrated in FIG. 4(A) is shifted to the state in which the same information is temporarily displayed on the first display unit 16a and the second display unit 16b (the display state in which the first display unit 16a copies the display contents on the second display unit 16b) as illustrated in FIG. 4(B). Thereafter, the display mode is shifted to the interactive mode or the ambient mode, and then the operation of the second display unit 16b is stopped and an arbitrary message or the like can be displayed on the first display unit 16a as illustrated in FIG. 4(C).

Thus, when the classic mode is shifted to the interactive mode or the ambient mode, it is possible to smoothly shift the display screen, and suppress uncomfortable feeling given to the user.

Modified Example 1

In the above described embodiment, it has been described that when the display mode is switched from the classic mode to the interactive mode or the ambient mode, the cooperative processing unit 11g temporarily superimposes and displays the same information on the first display unit 16a and the second display unit 16b, and then the display mode of the information processing apparatus 100 is shifted to the interactive mode (or the ambient mode).

In contrast, when the display mode is switched from the classic mode to the interactive mode or the ambient mode, information to be temporarily superimposed and displayed on the first display unit 16a and the second display unit 16b may be different between the first display unit 16a and the second display unit 16b. In other words, the first display unit 16a and the second display unit 16b are arranged by being layered, and a slight shift can be visually recognized by the user although the same information is displayed. Thus, the information to be displayed on the first display unit 16a at the time when the display mode is switched can be displayed by being enlarged or reduced compared to the information displayed on the second display unit 16b in the classic mode.

In other words, in the display form of the modified example 1, a form to temporality display, on the first display unit 16a, the limited information (the first information) displayed on the second display unit 16b is different from a form to display the limited information on the second display unit 16b.

Figure 5A:
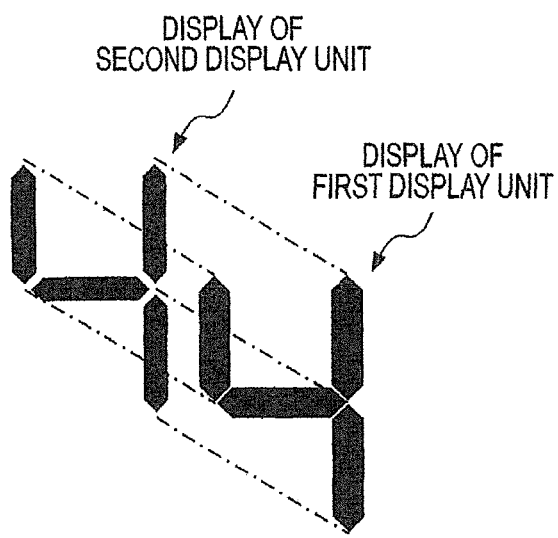
FIG. 5A is a diagram schematically illustrating a size of information to be displayed when a display mode is switched, and illustrating a state in which a size of information to be displayed on a first display unit is enlarged compared to a size of information to be displayed on a second display unit.
Figure 5B:
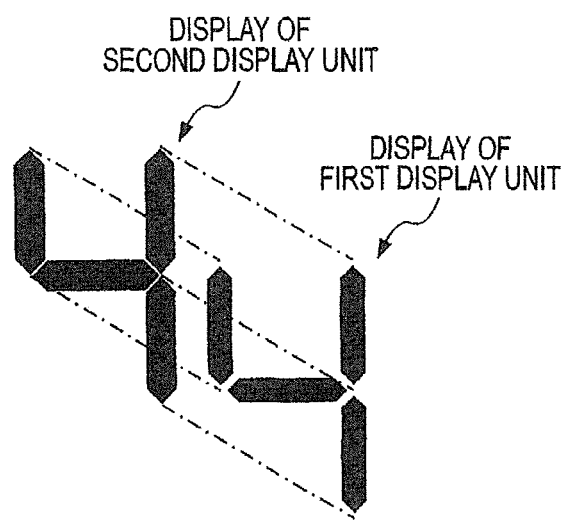
FIG. 5B is a diagram schematically illustrating a size of information to be displayed when a display mode is switched, and illustrating a state in which a size of information to be displayed on the first display unit is reduced compared to a size of information to be displayed on the second display unit.

FIGS. 5(A) to 5(B) are diagram schematically illustrating sizes of information to be displayed when the display mode is switched. FIG. 5(A) illustrates that a size of information displayed on the first display unit 16a is enlarged compared to that on the second display unit 16b. FIG. 5(B) illustrates that a size of information displayed on the first display unit 16a is reduced compared to that on the second display unit 16b.

As illustrated in FIG. 5(A), for example, the thickness of the segment superimposed and displayed on the first display unit 16a can be bolder than that displayed on the second display unit 16b.

In this case, the user does not recognize that the information temporarily superimposed and displayed on the first display unit 16a and the second display unit 16b has a shift, and the elements (the segments and the like) of the information displayed on the second display unit 16b are included in the areas of the elements of the information displayed on the first display unit 16a which are positioned therebehind. At this time, the user recognizes that the elements of the displayed information seem to be slightly enlarged. Then, when the operation of the second display unit 16b is stopped, the display on the first display unit 16a is maintained, and it is possible to suppress the user's recognition of the shift of the displayed information. Note that, the elements of the information displayed on the first display unit 16a can be reduced and returned to the normal size thereafter.

On the other hand, as illustrated in FIG. 5(B), for example, the thickness of the segment superimposed and displayed on the first display unit 16a can be thinner than that displayed on the second display unit 16b.

In this case, the user does not recognize that the information temporarily superimposed and displayed on the first display unit 16a and the second display unit 16b has a shift, and the areas of the elements (the segments and the like) of the information displayed on the second display unit 16b include the elements of the information displayed on the first display unit 16a which are positioned therebehind. At this time, when viewed from the user, the elements of the displayed information are hardly changed. Then, when the operation of the second display unit 16b is stopped, the display on the first display unit 16a appears. At this time, the user recognizes that the elements of the displayed information seem to be slightly reduced. In other words, it is possible to suppress the user's recognition of the shift of the displayed information. Note that, the elements of the information displayed on the first display unit 16a can be enlarged and returned to the normal size thereafter.

Also in this case, it is possible to smoothly shift the display screen, and suppress uncomfortable feeling given to the user.

Modified Example 2

In the above described embodiments, it has been described that the cooperative processing unit 11g temporarily superimposes and displays the same information on the first display unit 16a and the second display unit 16b when the display mode is switched from the classic mode to the interactive mode or the ambient mode, but the information temporarily superimposed and displayed is not limited to this. In other words, when the display mode is switched from the classic mode to the interactive mode or the ambient mode, the information temporarily superimposed and displayed on the first display unit 16a and the second display unit 16b by the cooperative processing unit 11g may be a part of the information displayed on the second display unit 16b.

FIGS. 6(A) to 6(C) are diagrams schematically illustrating an example (modified example) of states of the display screens of the information processing apparatus 100 when the display control processing is performed. FIG. 6(A) illustrates a display state in the classic mode. FIG. 6(B) illustrates a display state while the classic mode is shifted to the interactive mode (or the ambient mode). FIG. 6(C) illustrates a display state in the interactive mode (or the ambient mode).

When the display mode is switched from the classic mode illustrated in FIG. 6(A) to the interactive mode or the ambient mode illustrated in FIG. 6(C), in the switching display screen, an area to display an arbitrary message or the like is formed in a part of the display screen of the first display unit 16a, and the same information as the display on the second display unit 16b can be temporarily superimposed and displayed in the other area as illustrated in FIG. 6(B). Note that, in the area, which is a part of the display screen of the first display unit 16a, to display an arbitrary message or the like, the second display unit 16b may not perform display (the area may transmit light) like a part corresponding to the part indicating "53" (the number indicating seconds) on the second display unit 16b illustrated in FIG. 6(B).

Also in this case, it is possible to smoothly shift the display screen, suppress uncomfortable feeling given to the user, and promptly inform the user of an arbitrary message or the like.

Modified Example 3

In the above described embodiments, while the first display unit 16a displays, in addition to the time, other information (an arbitrary message or the like), the state determination unit 11i counts the time during which the information is continuously displayed, and when the counted time reaches a threshold, the display may be switched to the display of the time on the second display unit 16b (the classic mode).

Thus, it is possible to increase the timings to perform display in the classic mode and for the information processing apparatus 100 to operate with lower power consumption.

Modified Example 4

In the above described embodiments, it has been described that the display mode is switched to the interactive mode or the ambient mode when the information which cannot be displayed in the classic mode needs to be displayed, but the display mode is not limited to this.

For example, when the display mode is switched from the classic mode in which display is performed on the second display unit 16b to the mode in which display is performed on the first display unit 16a, the display mode may be switched to the ambient mode. In this case, the display mode can be switched only from the ambient mode to the interactive mode.

On the other hand, when the display mode is switched so as to perform display on the second display unit 16b in the classic mode, the display mode may be switched from the state in which the display is performed on the first display unit 16a in the ambient mode. In this case, the display mode is switched from the interactive mode only to the ambient mode.

The interactive mode and the ambient mode as well as the ambient mode and the classic mode may be set to be mutually switchable, and the interactive mode and the classic mode may be set to be unswitchable.

In other words, the interactive mode can be set as a mode in which information is constantly displayed on the first display unit 16a, the classic mode can be set as a mode in which information is constantly displayed on the second display unit 16b, and the ambient mode can be set as a mode in which the display on the first display unit 16a and the display on the second display unit 16b are switchable.

Thus, it is possible to associate the modes with the usage forms of the display units, and clarify the situation to use the modes.

The information processing apparatus 100 configured as described above includes the first display unit 16a, the second display unit 16b, the first display control unit 17, the second display control unit 18, and the cooperative processing unit 11g.

The first display control unit 17 displays the first information on the second display unit 16b.

The second display control unit 18 displays, on the first display unit 16a, at least a part of time information (the first information) and various types of display information (the second information) undisplayable on the second display unit 16b.

The cooperative processing unit 11g alternatively selects the control by the first display control unit 17 or the second display control unit 18.

Thus, when two display units of the first display unit 16a and the second display unit 16b are provided, it is possible for the information processing apparatus 100 to perform display with lower power consumption.

Furthermore, the information processing apparatus 100 includes the communication unit 22 and the state determination unit 11i.

The communication unit 22 acquires various types of display information undisplayable on the second display unit 16b.

The state determination unit 11i determines whether the communication unit 22 has acquired the various types of display information undisplayable on the second display unit 16b.

When the state determination unit 11i determines that the communication unit 22 has acquired the various types of display information undisplayable on the second display unit 16b, the cooperative processing unit 11g selects the control by the first display control unit 17.

Thus, it is possible for the information processing apparatus 100 to display various types of information while performing the display with lower power consumption.

When the state determination unit 11i determines that the communication unit 22 has acquired the various types of display information undisplayable on the second display unit 16b while the second display control unit 18 is displaying the time information on the second display unit 16b, the cooperative processing unit 11g stops the control of the second display unit 16b by the second display control unit 18, and selects the control by the first display control unit 17 so as to display, on the first display unit 16a, the time information and the various types of display information undisplayable on the second display unit 16b.

Thus, when the display on the second display unit 16b is shifted to the display on the first display unit 16a, it is possible to smoothly shift the display screen, and suppress uncomfortable feeling given to the user.

When the state determination unit 11i determines that the communication unit 22 has acquired the various types of display information undisplayable on the second display unit 16b, the cooperative processing unit 11g selects the control by the first display control unit 17 so as to display, on the first display unit 16a, a part of the time information and the various types of display information undisplayable on the second display unit 16b.

Thus, it is possible to continuously display a part of the time information, and the display various types of display information on the other part.

Furthermore, the communication unit 22 acquires the various types of display information undisplayable on the second display unit 16b from another apparatus connected to the information processing apparatus 100 by communication.

Thus, while the time information is being displayed, it is possible to successively display the various types of information received from another apparatus, such as a paired smart phone.

The second display unit 16b operates with lower power consumption than the first display unit 16a.

Thus, it is possible to successively display, on the first display unit 16a, the information which cannot be displayed on the second display unit 16b while the time information is being displayed on the second display unit 16b with low power consumption.

The second display unit 16b is a simple matrix type liquid crystal display apparatus, and the first display unit 16a is an active matrix type liquid crystal display apparatus.

Thus, it is possible to quickly perform high-functional display on the first display unit 16a, and also perform limited display on the second display unit 16b with low power consumption.

Furthermore, the information processing apparatus 100 includes the mode setting unit 11f.

The mode setting unit 11f switches the interactive mode in which predetermined information is constantly displayed only on the first display unit 16a and the ambient mode in which the first display unit 16a and the second display unit 16b are switched at a predetermined timing.

When the mode setting unit 11f switches the display mode to the interactive mode, the cooperative processing unit 11g selects the control by the first display control unit 17 so as to constantly display the predetermined information on the first display unit 16a.

Thus, it is possible to constantly perform high-functional display on the first display unit 16a in the interactive mode, and switch the display on the first display unit 16a to the display on the second display unit 16b in the ambient mode.

The mode setting unit 11f switches the classis mode in which predetermined information is constantly displayed only on the second display unit 16b and the ambient mode in which the first display unit 16a and the second display unit 16b are switched at a predetermined timing.

When the mode setting unit 11f switches the display mode to the ambient mode, the cooperative processing unit 11g selects the control by the second display control unit 18 so as to constantly display only the clock information on the second display unit 16b.

Thus, it is possible to constantly perform display on the second display unit 16b with low power consumption in the classic mode, and switch the display on the second display unit 16b to the display on the first display unit 16a in the ambient mode.

The state determination unit 11i counts the time during which time information and the various types of display information undisplayable on the second display unit 16b are displayed on the first display unit 16a.

When the counted time exceeds the predetermined time, the state determination unit 11i stops the control of the first display unit 16a, and selects the control by the second display control unit 18 so as to display only the time information on the second display unit 16b.

Thus, it is possible to increase the timings to perform display on the second display unit 16b and for the information processing apparatus 100 to operate with lower power consumption.

The form of the time information displayed on the first display unit 16a is different form the form of the time information displayed on the second display unit 16b.

Thus, it is possible to perform display and the like so as not to emphasize a shift according to the installation state of the first display unit 16a and the second display unit 16b.

Note that, the present invention is not limited to the above described embodiments, and includes modifications and improvements within the scope in which the purpose of the present invention can be attained.

In the above described embodiments, to switch the display mode from the classic mode to the interactive mode or the ambient mode, when the cooperative processing unit 11g temporarily superimposes and displays information on the first display unit 16a and the second display unit 16b, the boundary of the segment (the edge of the segment) on the second display unit 16b which is recognized in the non-display state may be displayed on the first display unit 16a. Thus, it is possible to perform display closer to the display contents on the second display unit 16b, and suppress uncomfortable feeling given to the user when the display screen is shifted.

Furthermore, in the above described embodiments, the information to be displayed on the second display unit 16b includes, in addition to the segment of the clock display, objects to be displayed fixedly or selectively. For example, icons indicating a battery remaining amount and a connection state of communication, a message to urge charging, or the like can be displayed on the second display unit 16b.

Furthermore, in the above described embodiments, a display apparatus in which a part to which potential is not applied is light-transmissive may be used as the second display unit 16b.

Moreover, in the above described embodiments, it has been exemplified that the information processing apparatus 100 to which the present invention is applied is a wearable information processing apparatus, but the present invention is not limited to this.

For example, the present invention can be applied to a general electronic device having an information processing function. Specifically, for example, the present invention can be applied to a laptop personal computer, a printer, a television receiver, a video camera, a portable navigation apparatus, a mobile phone, a smart phone, a portable game machine, or the like.

Furthermore, in the above described embodiments, it has been described that the second display unit 16b is a PN-type liquid crystal panel, but the second display unit 16b is not limited to this. The second display unit 16b is only required to be a display device which transmits light according to potential applied to the liquid crystal, and a transmissive display device, such as a polymer dispersed (PD) liquid crystal panel other than a PN-type, an organic electroluminescence (EL) panel, an inorganic EL panel, or a TFT liquid crystal panel, can be used.

Furthermore, in the above described embodiments, it has been described that the second display unit 16b is layered on the display screen of the first display unit 16a, but the configuration is not limited to this. In other words, by constituting the first display unit 16*a* of a transmissive display device, the first display unit 16*a* can be layered on the display screen of the second display unit 16*b*.

The above described series of processing can be executed by hardware or software.

The functional configuration of FIG. 2 is merely an example, and is not particularly limited. In other words, a function which can execute the above described series of processing as a whole is only required to be provided in the information processing apparatus 100, and functional blocks used to implement the function are not limited to the example of FIG. 2.

Furthermore, one functional block may be constituted only of hardware or only of software, or of the combination of the hardware and the software.

When the series of processing is executed by software, a program constituting the software is installed in a computer or the like from a network or a recording medium.

The computer may be incorporated in dedicated hardware. Furthermore, the computer may be a computer which can execute the various functions by installing various programs, for example, a general-purpose personal computer.

The recording medium containing these programs is not only constituted of a removable media distributed separately from the apparatus body to provide a user with the programs but also constituted of a recording medium pre-incorporated in the apparatus body and provided a user, or the like. The removable media is constituted of, for example, a magnetic disc (including a floppy disc), and an optical disc, an optical magnetic disc, or the like. The optical disc is constituted of, for example, a compact disk-read only memory (CD-ROM), a digital versatile disk (DVD), a Blu-ray (registered trademark) Disc (a Blu-ray disc), or the like. The optical magnetic disc is constituted of a mini-disk (MD), or the like. Furthermore, the recording medium pre-incorporated in the apparatus body and provided a user is constituted of, for example, the ROM 13 in FIG. 2 containing the programs, the hard disk included in the storage unit 15 in FIG. 2, or the like.

Note that, in this specification, the steps describing the programs recorded in the recording medium include the processing performed time-sequentially in the order, and also the processing which is not necessarily time-sequentially performed but performed in parallel or independently.

The embodiments of the present invention have been described in the above description, but are merely examples, and do not limit the technical scope of the present invention. The present invention can be applied to other various embodiments, and can be further variously changed, for example, omitted or replaced without departing from the gist of the present invention. The embodiments and the modifications are included in the scope and the gist of the invention described in the specification, and further included in the scope described in the claims and equivalents thereof.

The invention claimed is:

1. A display control device comprising a first display, a second display, a first processor, and a second processor,
wherein the first processor controls the first display to display a first information,
wherein the second processor controls the second display to display second information which is undisplayable on the first display,
wherein the second processor sets a power consumption mode from a plurality of power consumption modes, wherein the plurality of power consumption modes includes a plurality of different power consumption modes, and
in the case that the second information needs to be displayed, wherein the second processor controls the second display to display at least a part of the first information and the second information based on the set power consumption mode.

2. The display control device according to claim 1,
in the case that the second processor acquires the second information, wherein the second processor controls the second display to display at least a part of the first information and the second information.

3. The display control device according to claim 2,
in the case that the second processor acquires the second information, wherein the second processor controls the first processor to control the first display to stop displaying operation, and controls the second display to display at least a part of the first information and the second information.

4. The display control device according to claim 1,
wherein the second processor determines whether the second information needs to be displayed or not;
in the case that the second information needs to be displayed, wherein the second processor controls the second display to display at least a part of the first information and the second information.

5. The display control device according to claim 1,
wherein the second processor sets a low power consumption mode;
wherein the second processor determines whether the second information can be displayed on the first display in the low power consumption mode;
in the case that the second information has been determined as undisplayable on the first display, wherein the second processor controls the second display to display at least a part of the first information and the second information.

6. The display control device according to claim 1,
wherein a display capability of the first display is lower than a display capability of the second display.

7. The display control device according to claim 1,
wherein energy consumption of the first display is lower than energy consumption of the second display.

8. The display control device according to claim 1,
wherein the first display is a simple matrix type liquid crystal display which displays black and white images;
wherein the second display is a display which can display a plurality of colors of an image;
wherein the second information comprises a plurality of colors of the image.

9. The display control device according to claim 1,
wherein the first display is superposed on the second display.

10. The display control device according to claim 1, comprising:
a non-transitory computer-readable recording medium storing a program for causing a computer which controls an information processing apparatus to implement:
a first display control function to display the first information on the first display; and
a second display control function to display, on the second display, second information undisplayable on the first display.

11. A display control device comprising a first display, a second display, a first processor, and a second processor, wherein the first processor controls the first display to display first information, and wherein the second processor controls the second display to display second information which is undisplayable on the first display, wherein the second processor controls the second display to display the first information while the first display displays the first information;

when predetermined time has elapsed since the second display starts to display the first information, the first processor controls the first display to terminate a displaying process, and the second processor controls the second display to display a part of the first information and the second information.

* * * * *